(12) United States Patent
Peters et al.

(10) Patent No.: US 11,992,811 B2
(45) Date of Patent: May 28, 2024

(54) CROSSLINKED HOLLOW-FIBRE MEMBRANES AND NEW PROCESS FOR MANUFACTURING THE SAME

(71) Applicant: EVONIK OPERATIONS GMBH, Essen (DE)

(72) Inventors: Lars Peters, Weyregg am Attersee (AT); Kah Peng Lee, Seewalchen (AT); Dominik Lehner, Gunskirchen (AT)

(73) Assignee: Evonik Operations GmbH, Essen (DE)

(*) Notice: Subject to any disclaimer, the term of this patent is extended or adjusted under 35 U.S.C. 154(b) by 49 days.

(21) Appl. No.: 17/348,747

(22) Filed: Jun. 15, 2021

(65) Prior Publication Data
US 2021/0394125 A1 Dec. 23, 2021

(30) Foreign Application Priority Data

Jun. 17, 2020 (EP) ..................................... 20180575

(51) Int. Cl.
| | |
|---|---|
| *B01D 69/08* | (2006.01) |
| *B01D 53/22* | (2006.01) |
| *B01D 63/02* | (2006.01) |
| *B01D 67/00* | (2006.01) |
| *B01D 71/64* | (2006.01) |

(52) U.S. Cl.
CPC ......... *B01D 69/088* (2013.01); *B01D 63/021* (2013.01); *B01D 67/0006* (2013.01); *B01D 67/0016* (2013.01); *B01D 67/0083* (2013.01); *B01D 67/0095* (2013.01); *B01D 69/085* (2013.01); *B01D 71/64* (2013.01); *B01D 53/228* (2013.01); *B01D 2323/08* (2013.01); *B01D 2323/12* (2013.01); *B01D 2323/22* (2013.01); *B01D 2323/30* (2013.01);
(Continued)

(58) Field of Classification Search
CPC .. C02F 1/5209; C02F 1/56; C02F 1/68; C02F 1/66; C02F 5/00; C02F 2103/10; C02F 2209/003; C02F 2303/04; C02F 2303/08; C02F 2303/12; C02F 2303/22; C02F 2305/04; B82Y 20/00; B82Y 40/00; C01B 32/194; C09K 11/02; C09K 11/025; C09K 11/06; C09K 11/65; C08K 2201/011; C23F 11/149
See application file for complete search history.

(56) References Cited

U.S. PATENT DOCUMENTS

| | | | |
|---|---|---|---|
| 3,856,752 A | 12/1974 | Bateman et al. | |
| 5,727,903 A | 3/1998 | Borray et al. | |

(Continued)

FOREIGN PATENT DOCUMENTS

| | | |
|---|---|---|
| CN | 205420305 U | 8/2016 |
| GB | 1 354 927 | 6/1974 |

(Continued)

OTHER PUBLICATIONS

European Search Report and Search Opinion for corresponding European application EP 20 18 0575 filed Jun. 17, 2021.

(Continued)

*Primary Examiner* — Krishnan S Menon
(74) *Attorney, Agent, or Firm* — Law Office of: Michael A. Sanzo, LLC

(57) ABSTRACT

The present invention relates to high performance, cross-linked hollow-fibre membranes and a new process for manufacturing the same.

18 Claims, 3 Drawing Sheets

(52) U.S. Cl.
CPC .... *B01D 2325/023* (2013.01); *B01D 2325/24* (2013.01); *B01D 2325/30* (2013.01)

(56) References Cited

U.S. PATENT DOCUMENTS

| | | | |
|---|---|---|---|
| 6,197,090 | B1 | 3/2001 | Yamashita et al. |
| 8,999,036 | B2 | 4/2015 | Pierce |
| 8,999,038 | B2 | 4/2015 | Ungerank et al. |
| 9,314,735 | B2 | 4/2016 | Balster et al. |
| 9,469,048 | B2 | 10/2016 | Ungerank et al. |
| 9,713,791 | B2 | 7/2017 | Priske et al. |
| 9,770,687 | B2 | 9/2017 | Ungerank et al. |
| 9,873,093 | B2 | 1/2018 | Visser et al. |
| 10,040,036 | B2 | 8/2018 | Ungerank et al. |
| 10,118,136 | B2 | 11/2018 | Ungerank et al. |
| 10,456,750 | B2 | 10/2019 | Visser et al. |
| 10,471,380 | B2 | 11/2019 | Priske |
| 10,905,995 | B2 | 2/2021 | Prince et al. |
| 10,933,378 | B2 | 3/2021 | Visser et al. |
| 2007/0125537 | A1 | 6/2007 | Lokhandwala et al. |
| 2010/0288701 | A1 | 11/2010 | Zhou et al. |
| 2012/0000355 | A1 | 1/2012 | Sharma et al. |
| 2013/0192459 | A1 | 8/2013 | Wessling et al. |
| 2015/0336046 | A1 | 11/2015 | Ungerank et al. |
| 2016/0144323 | A1 | 5/2016 | Visser et al. |
| 2016/0310912 | A1 | 10/2016 | Ungerank et al. |
| 2016/0317981 | A1 | 11/2016 | Ungerank et al. |
| 2017/0320009 | A1 | 11/2017 | Hirata et al. |
| 2018/0099251 | A1 | 4/2018 | Visser et al. |
| 2018/0221824 | A1 | 8/2018 | Visser et al. |
| 2020/0316516 | A1 | 10/2020 | Wu et al. |
| 2021/0339189 | A1 | 11/2021 | Winkler et al. |
| 2021/0363463 | A1 | 11/2021 | Xie et al. |
| 2022/0134274 | A1 | 5/2022 | Pedersen et al. |

FOREIGN PATENT DOCUMENTS

| | | |
|---|---|---|
| GB | 2 010 794 | 7/1979 |
| JP | 2018086620 | 6/2018 |
| KR | 10-1840337 | 3/2018 |
| KR | 10-1840340 | 3/2018 |
| KR | 10-1840343 | 3/2018 |
| KR | 10-1863058 | 6/2018 |
| WO | WO 93/12868 | 7/1993 |
| WO | WO 2007/007051 | 1/2007 |
| WO | WO 2011/108929 | 9/2011 |
| WO | WO 2014/183977 | 11/2014 |
| WO | WO 2016/198450 | 12/2016 |
| WO | WO 2022/012944 | 1/2022 |

OTHER PUBLICATIONS

Dutczak, et al., "Chemistry in a spinneret to fabricate hollow fibres for organic solvent nanofiltration," *Separation and Purification Technology* 86:183-189 (Feb. 2012).

Kopeć, et al., "Chemistry in a spinneret—On the interplay of crosslinking and phase inversion during spinning of novel hollow fiber membranes," *Journal of Membrane Science* 369:308-318 (Mar. 2011).

Shao, et al., "The effects of 1,3-cyclohexanebis(methylamine) modification on gas transport and plasticization resistance of polyimide membranes," *Journal of Membrane Science* 267:78-89 (Dec. 2005).

Shao, et al., "Polyimide modification by a linear aliphatic diamine to enhance transport performance and plasticization resistance," *Journal of Membrane Science* 256:46-56 (Jul. 2005).

Alqaheem, et al., "Polymeric Gas-Separation Membranes for Petroleum Refining," *International Journal of Polymer Science* 2017:1-19 (Jan. 2017).

Castrillon, et al., "$CO_2$ and $H_2S$ Removal from $CH_4$-Rich Streams by Adsorption on Activated Carbons Modified with $K_2CO_3$, NaOH, or $Fe_2O_3$," *Energy & Fuels* 30(11):9596-9604 (Oct. 2016).

Chiang, et al., "Effect of Relative Humidity on Adsorption Breakthrough of $CO_2$ on Activated Carbon Fibers," *Materials* 10(11):1-14 (Nov. 2017).

Leuch, et al., "Hydrogen Sulfide Adsorption and Oxidation onto Activated Carbon Cloths: Applications to Odorous Gaseous Emission Treatments," *Langmuir* 19(26):10869-10877 (Dec. 2003).

Yin, et al., "Effects of temperature and relative humidity on the methane permeability rate of biogas storage membranes," *International Journal of Green Energy* 13(9):951-956 (Jul. 2016).

U.S. Appl. No. 16/305,575, filed Nov. 29, 2018, US-2020/0316516 A1, Oct. 8, 2020, Wu.

U.S. Appl. No. 17/281,962, filed Mar. 31, 2021, US-2021/0339189 A1, Nov. 4, 2021, Winkler.

U.S. Appl. No. 17/427,555, filed Jul. 30, 2021, US-2022/0134274 A1, May 5, 2022 Pedersen.

CROSSLINKED HOLLOW-FIBRE MEMBRANES AND NEW PROCESS FOR MANUFACTURING THE SAME

CROSS REFERENCE TO RELATED APPLICATIONS

The present application claims priority under 35 USC § 119 to application EP 20180575.1, filed in Europe on Jun. 17, 2020, the contents of which is incorporated herein by reference in its entirety.

FIELD OF THE INVENTION

The present invention relates to high performance, crosslinked hollow-fibre membranes and a new process for manufacturing the same.

BACKGROUND OF THE INVENTION

Multilayer hollow-fibre membranes are well-known in the art. They usually consist of a supporting layer and a separation layer which can be made of different materials (asymmetric composite membranes) or of essentially the same materials (integrally asymmetric membranes). In both cases, the supporting layer and separating layer possess a different morphology.

Especially polyimide membranes are known to have very good intrinsic separation properties but tend to fail when they come in contact with high levels of $CO_2$, $H_2S$ or higher hydrocarbons. Especially in natural gas sweetening, i.e. removal of $CO_2$ from the product gas $CH_4$, membranes typically encounter feed streams that contain numerous higher hydrocarbons (03+, aromatic and aliphatic), high levels of $CO_2$ and $H_2S$.

The typical approach to make membranes more robust and resistant to such conditions is to crosslink the polymer chain.

The most well-known process is to chemically crosslink membranes. US 2016/0310912A1 for example discloses a crosslinking process of hollow-fibre and flat sheet membranes wherein the membranes are treated with diamines in a downstream step of the membrane production process. This process is very complicated, environmentally unfriendly and cost intense because large amounts of diamines and additional equipment for the crosslinking step are needed.

WO 2014//202324 A1 discloses a process to produce gas separation membranes showing a good separation performance even after use under harsh conditions over a long period of time. The membranes are thermally crosslinked at very high temperatures in an atmosphere with very low $O_2$ content. The energy consumption of this process is very high.

K. K. Kopec et al, "Chemistry in a spinneret—On the interplay of crosslinking and phase inversion during spinning of novel hollow-fibre membranes", J. Membr. Sci., 369 (2011), 308-318 as well as S. M. Dutczak et al, "Chemistry in a spinneret to fabricate hollow fibres for organic solvent nanofiltration", Separation and Purification Technology, 86 (2012), 183-189, and WO20111/108929, disclose a one-step membrane production and crosslinking process. In said process an organic nucleophilic crosslinking agent is added to the bore liquid used in the spinning process. Crosslinking occurs in-line during membrane formation. No separate, downstream crosslinking steps are needed. According to said publications membranes comprising large pores, that can only be used as ultrafiltration membranes, are obtained if low molecular weight diamines are used as organic nucleophilic crosslinking agent. To obtain membranes suitable for gas separation high molecular weight amines (e.g. polyethyleneimine or PEI) had to be used as crosslinker. In that case, however, it turned out that it was very difficult to reduce the thickness of the separation layer and to obtain good gas permeance. The mechanical stability of the membranes was insufficient.

As consequence a strong need for an efficient process to produce hollow-fibre membranes with high insolubility and good mechanical strength remains.

BRIEF DESCRIPTION OF THE INVENTION

Object of the present invention was to provide a new production process for hollow-fibre membranes without the disadvantages of the prior art processes respectively having such disadvantages only to a reduced degree. Another object was to provide new hollow-fibre membranes.

A particular object of the invention was to provide a production process for hollow-fibre membranes allowing to obtain hollow-fibre membranes with high chemical resistance and good mechanical strength. Preferably this should be achieved without use of a separate post treatment step to crosslink the membranes. Even more preferred a continuous production process for such hollow-fibre membranes should be provided.

It was further an object to provide a cost-efficient process, in particular in view of energy consumption and invest costs for equipment. Even more preferred it should be possible to implement the new process in an existing plant with low investment costs.

Object of the invention was also to provide a process that allows to produce membranes with a high-selectivity and good separation performance. The membranes should preferably be applicable in a wide range of applications like for example gas separation, organic solvent nanofiltration, vapor recovery.

The new process should preferably be applicable for a variety of polymers.

A special object of the invention was to provide a process that allows to control of the thickness of the separating layer of the membranes and/or to produce membranes with an inner and/or outer separating layer, i.e. a separating layer at the inside and/or outside of the membrane, preferably at the outside.

Further objects which are not stated explicitly are evident from the overall content of the claims, description, examples and figures which follow.

The inventors surprisingly found out that these problems can be solved by a process as described in claim 1 as well as by membranes obtainable with said process. Addition of a crosslinking agent with at least two amino groups to the bore solution in a membrane spinning process followed by thermal post treatment of the dried membranes under mild conditions leads to highly crosslinked membranes having good chemical resistance, mechanical strength, high selectivity and good separation performance (permeability).

The new process is cost efficient because it is an in-line process, i.e. no separate post-treatment crosslinking step is necessary. The process of the invention is less toxic and produces less wastewater compared to prior art processes. Costs could be reduced by reducing the amounts of crosslinker.

The mild conditions for the thermal post treatment, i.e. at lower temperature compared to the prior art, provide additional economic benefits. Finally, the new process is beneficial because it can be implemented in existing plant equipment.

In contrast to one-step crosslinking process suggested in the prior art, the fibres obtained with the process of the invention do not have large pores and are suitable for gas separation even if low molecular weight diamines are used as crosslinker.

Another important benefit of the process of the invention, compared to the one-step crosslinking process of the prior art, is that integrally asymmetric membranes with an outer dense layer can be obtained even though the crosslinking agent is part of the bore solution spun through the central orifice of the spinning die. Thus, membranes with dense outer layer can be obtained by using a double-orifice spinneret as being installed in most of the existing plants. In the prior art membranes with inner dense layer were obtained if a crosslinker was added to the bore solution. A dense inner layer, however, is usually not desired and can be a risk of failure and delamination of the hollow fibre.

Without being bound to any theory, the inventors believe that this specific benefit of the invention can be achieved if a less polar and less water-soluble amine based crosslinker is used. Such crosslinker preferably diffuses from the bore solution into the wall pores and further on into the polymer in a more even fashion, whereas more polar and water-soluble amine based crosslinker, as used in the prior art, preferably remain in the bore liquid and then diffuse into the polymer only next to the bores.

The process of the invention allows to flexibly control the degree of crosslinking of the membranes up to 100%, i.e. 100% insolubility in DMF, the mechanical strength and/or the thickness of the dense layer. Thus, the membranes can be tailormade for different applications like gas separation, vapor recovery and organic solvent nanofiltration.

Different types of polymers can be used in the process of the invention, which further increases its flexibility.

Further advantages which are not stated explicitly are evident from the overall content of the claims, description, examples and figures which follow.

BRIEF DESCRIPTION OF THE DRAWINGS

FIG. 1 is a schematic depiction of a double-orifice spinneret that may be used in the process for making hollow fibre membranes described herein. Reference numeral 1 shows an outer annular orifice of the spinneret and reference numeral 2 shows a central annular orifice of the spinneret.

FIG. 2 is a schematic depiction of a tiple-orifice spinneret that may be used in the process for making hollow fibre membranes described herein. Reference numeral 3 shows an outer annular orifice of the spinneret, reference numeral 1 shows an intermediate annular orifice and reference numeral 2 shows a central annular orifice.

FIG. 3a: FIG. 3a shows a hollow fibre membrane of the invention with a non-homogeneous support layer. Two inner layers are visible with a dividing line between them.

FIG. 3b is a hollow fibre membrane of the invention with a homogeneous support layer.

DETAILED DESCRIPTION OF THE INVENTION

Figure 1:
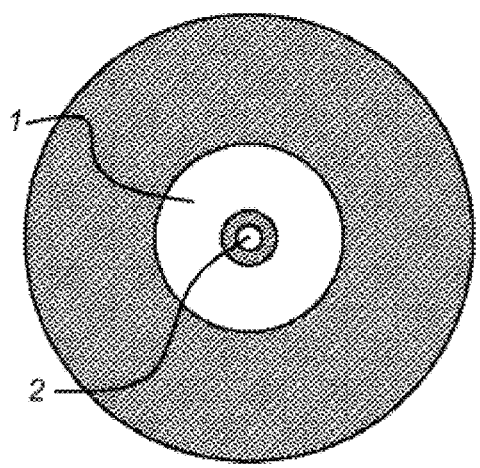
FIG. 1.

Before describing details of the invention, some general definitions are provided as follows:

The verb "to comprise" as is used in the description, examples and the claims and its conjugation is used in its non-limiting sense to mean that items following the word are included, bit items not specifically mentioned are not excluded. "Comprising" includes "consisting of" meaning that items following the word are included, bit items not specifically mentioned are excluded, as preferred embodiment.

Reference to an element be the indefinite article "a" or "an" does not exclude the possibility that more than one of the elements is present, unless the context clearly requires that there is one and only one of the elements. The indefinite article "a" or "an" thus usually means "one or more".

"Obtainable by" as is used in the description and the claims is used in its non-limiting sense to mean that a product obtainable by the process described following the word can, but does not need to be, obtained by the described process. If an identical product can be obtained by a different process it is also covered. "Obtainable" includes "obtained by" as preferred embodiment. "Phase (a1)" and "phase (a1) composition" means a composition comprising a polymer (a1.i) and a solvent (a1.ii) for the said polymer. "Phase (a1) compositions" are known in the art as "spinning compositions" or "dope solutions" or "cast solutions".

"Phase (a2)" and "phase (a2) composition" means a composition comprising a non-solvent for polymer (a1.i) and one or more aliphatic or aromatic amine(s) with at least two amino groups (a2.i). Extruded through the central orifices of a spinning die phase (a2) is also referred to as "bore liquid", whereas such phase extruded through an outer orifice are also referred to as "shell liquid".

A1.ii, i.e. a "solvent or solvent mixture for polymer (a1.i)" is a liquid or mixture of liquids wherein in both cases the polymer (a1.i) can be dissolvent entirely. A solvent mixture (a1.ii) for polymer (a1.i) can be a mixture of different solvents for polymer (a1.i) but it can also be a mixture of solvents and non-solvents for polymer (a1.i) wherein the content of solvents is high enough so that the polymer (a1.i) can be entirely dissolved.

A "non-solvent or non-solvent mixture for polymer (a1.i)" is a liquid or a mixture of liquids wherein in both cases the polymer (a1.i) cannot be dissolvent entirely, preferably, wherein it cannot be dissolved at all. A non-solvent mixture for polymer (a1.i) can be a mixture of different non-solvents for polymer (a1.i) but it can also be a mixture of solvents and non-solvents for polymer (a1.i) wherein the content of solvents is so low that the polymer (a1.i) cannot be entirely dissolved in the mixture.

"Annealing temperature" as is used in this description, examples and claims relates to the temperature of the atmosphere surrounding the membrane during the thermal treatment step (d) at a distance of up to 10 cm, preferably 2 to 10 cm to the outer surface of the membrane.

The present invention relates to a process for manufacturing a hollow-fibre membrane, comprising the steps:
(a) spinning of a hollow-fibre membrane, the spinning process comprising
(a1) extruding through an orifice, preferably an annular orifice, of a hollow-fibre die a phase (a1) composition, preferably a solution, comprising
(a1.i) a polymer selected from the group consisting of, optionally functionalized, polyimides, co-polyimides, block-copolyimides, polyetherimides, polyamidoimides, or mixtures or blends thereof, and
(a1.ii) a solvent or solvent mixture for said polymer (a1.i);
(a2) co-extruding through a central, preferably annular, orifice of the hollow-fibre die and/or through an outer orifice, preferably an annular orifice, of a hollow-fibre die a phase (a2) composition comprising
(a2.i) an amine based crosslinker, preferably an aliphatic or aromatic amine, with at least two amino groups,
(a2.ii) a non-solvent or non-solvent mixture for the polymer (a1.i), (b) passing the hollow-fibre membrane through a coagulation bath,
(c) drying of the hollow-fibre membrane to an overall water and/or residual solvent content of from 0% to 5% by weight
(d) thermal treatment of the hollow-fibre membrane at an annealing temperature of 150 to 280° C., preferably 160 to 270° C., more preferred 160 to 260° C., even more preferred 170 to 250° C., particular preferred 170 to 240° C. and most preferred 180 to 230° C., preferably for 15 to 180 min, more preferred for 30 to 150 min, even more preferred for 45 to 120 min and most preferred for 50 to 100 min.

With the process of the invention in combination with the polymers used as polymers (a1.i) in step (a) membranes with good separation performance, good mechanical strength and chemical resistance can be obtained. Preference is given to polyimides, co-polyimides, block-copolyimides as polymer (a1.i). The polymer (a1.i) may be a homo-, random-, or copolymer or it may be mixture or blend of different polymers.

In principle all polyimides, co-polyimides, block-copolyimides, polyetherimides, polyamidoimides soluble in a solvent or solvent mixture (a1.ii) can be used in the process of the invention. In a preferred embodiment of the invention polyimides are used as polymers (a1.i) that are obtainable by polycondensation of
one or more dianhydride(s) selected from the group consisting of BTDA (3,3",4,4"-benzophenone-tetracarboxylic dianhydride), PMDA (pyromellitic dianhydride), BPDA (3,3',4,4'-biphenyl-tetracarboxylic dianhydride), ODPA (4,4'-oxydiphthalic anhydride), BPADA (4,4'-bisphenol A dianhydride. CAS No. 38103-06-9), 6FDA (4,4'-(hexafluoroisopropylidene) diphthalic anhydrides), 3,3",4,4"-Diphenylsulphone tetracarboxylic acid dianhydride (DSDA)
and
one or more diisocyanate(s) selected from the group consisting of 2,4-TDI (2,4-tolylene diisocyanate), 2,6-TDI (2,6-tolylene diisocyanate) and 4,4'-MDI (4,4'-methylene diphenyl diisocyanate), MesDI (mesitylenediisocyanate, 2,4,6-trimethyl-1,3-phenylene diisocyanate), 2,3,5,6-tetramethyl-1,4-phenylene diisocyanate, diethylmethylbenzenediisocyanate, phenylindane based diisocyanates, and 4,4'-methylene 2,2",6,6'-di-dimethylphenyl diisocyanate.

Instead of diisocyanates the corresponding diamines can be used. In that case a polyamic acid is formed as intermediate which is transformed into a soluble polyimide in a second step, for example by chemical or thermal imidization. Such imidization processes are known to a man skilled in the art.

It is particularly preferred if the polymer (a1.i) is a polyimide having a structure according to Formula (1):

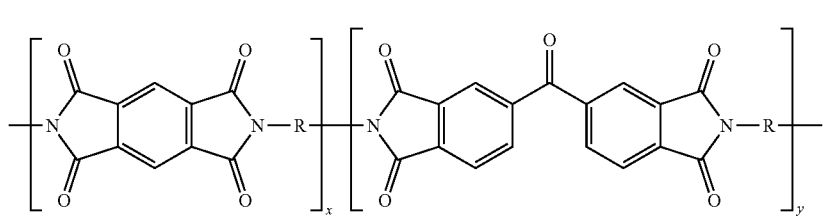

Formula (1)

where 0≤x≤0.5 and 1≥y≥0.5, the sum of x and y=1 and R represents one or more, identical or different moieties selected from the group consisting of the moieties L1, L2, L3 and L4.

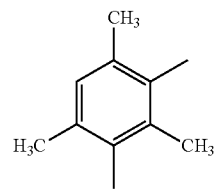

L1

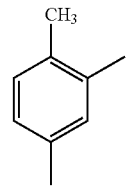

L2

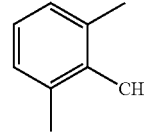

L3

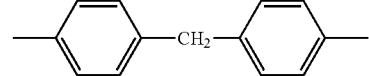

L4

The polyimide is very particularly preferably a polymer according to Formula (1) where x=0, y=1 and R consists of 64 mol % L2, 16 mol % L3 and 20 mol % L4. This polymer is commercially available under the name P84 or P84 type 70 and has the following CAS number: 9046-51-9.

Also, very particular preferably the polyimide of Formula (1) is a polymer having the composition x=0.4, y=0.6 and R consists of 80 mol % L2 and 20 mol % L3. This polymer is commercially available under the name P84HT or P84 HT 325 and has the following CAS number: 134119-41-8.

Details regarding the production of these and further similar polyimides can be extracted from WO 2011/009919, the content of which is hereby explicitly incorporated in the description of the present invention by reference. All polymers described in the examples of WO 2011/009919 are particularly preferred used as polymer (a1.i) in step (a1) of the process of the present invention. DE 21 43 080 describes the manufacture of solvent soluble polyimides made from BTDA and mixtures of toluene-2,4-diisocyanate, toluene-2,6-diisocyanate and 4,4'-methylenediphenyl-diisocyanate. It also describes the manufacture of solvent soluble polyamic acid from BTDA and mixtures of toluene-2,4-diamine, toluene-2,6-diamine, 4,4'-methylenediphenyl-diamine as well as the subsequent imidation to the corresponding polyimide. Details regarding the production of these and further similar polyimides and polyamic acids can be extracted from DE 21 43 080, the whole content of bot documents is hereby explicitly incorporated in the description of the present invention by reference. All polymers described in the examples of DE 21 43 080 are particularly preferred used in the process of the present invention.

In another preferred embodiment of the present invention the polymer (a1.i) is a block-copolyimide, i.e. copolymer comprising, preferably consisting of, the blocks (A) and (B) as per the ensuing Formulae (2) and (3):

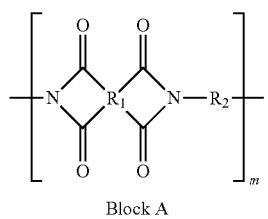

Block A
(2)

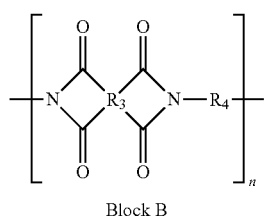

Block B
(3)

Said blocks A and B have a differing composition, i.e. the pairs $R_1$ and $R_3$ on the one hand and $R_2$ and $R_4$ on the other cannot each be identical at one and the same time.

The block copolyimide of this preferred embodiment comprises a continuous phase of block A wherein the functional group $R_1$ comprises either or both of the following functional groups:

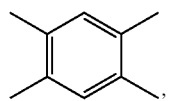

R1a

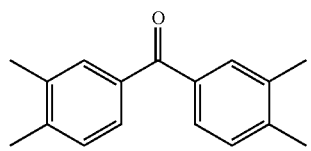

R1b $R_2$ comprises at least one or 2 or 3 of the following functional groups

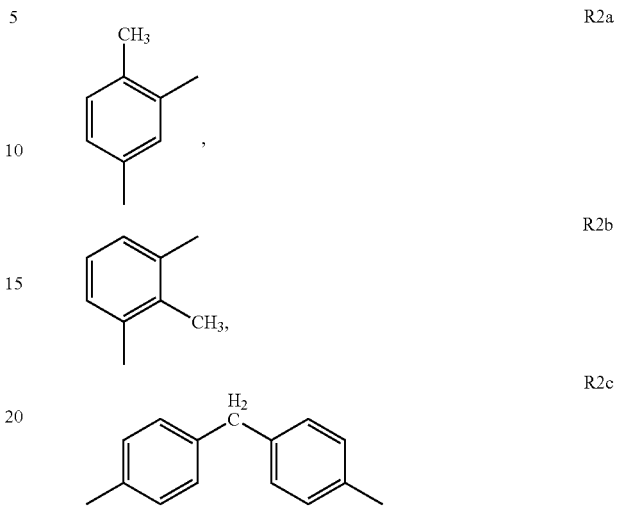

R2a

R2b

R2c

Block A has the following compositions in embodiments that are most preferable:

AF1: 100 mol % $R_1b$ and also 64 mol % $R_2a$, 16 mol % $R_2b$ and 20 mol % $R_2c$.

AF2: 40 mol % $R_1a$, 60 mol % $R_1b$ and also 80 mol % $R_2a$, 20 mol % $R_2b$.

The recited mole percentages relate to the functional groups $R_1$ and $R_2$ such that the amounts of the various units are each selected such that the sum is 100 mol % for each of these groups. Block B is elected to be a polymer that is distinctly more permeable than block A. $R_3$ in block B comprises at least one or more of the following functional groups:

R3a

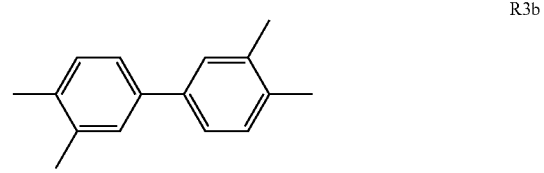

R3b

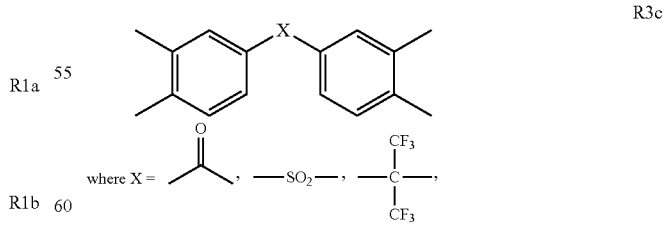

R3c where X =

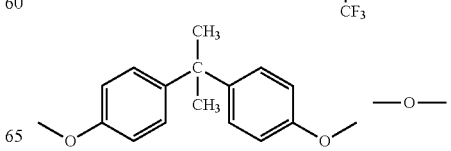

R4 comprises at least one or more of the following functional groups

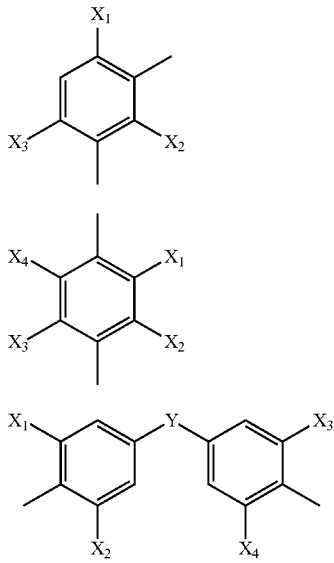

where $X_1$, $X_2$, $X_3$ and $X_4$ are either H or $CH_3$ or alkyl radicals with 2 to 4 carbon atoms and $Y=\!\!-CH_2-\!\!$, $-(CH_3)_2C-\!\!$, $-SO_2-\!\!$, $-(CF_3)_2C-\!\!$, $-CO-\!\!$, $-COO-\!\!$, $-CONH-\!\!$, $-O-\!\!$.

wherein at least one of the radicals $X_1$ to $X_4$, preferably at least two of the radicals $X_1$ to $X_4$, more preferably at least three of the radicals $X_1$ to $X_4$ and most preferably all the radicals $X_1$ to $X_4$ are equal to $CH_3$ or a $C_2$ to $C_4$ alkyl radical.

Y in $R_{4c}$ is preferably $-CH_2-\!\!$, $-(CH_3)_2C-\!\!$, $-(CF_3)_2C-\!\!$ or $-O-\!\!$, more preferably $Y=\!\!-CH_2-\!\!$ or $-(CH_3)_2C-\!\!$. It is very particularly preferable for Rac to have the following composition: $X_1$, $X_2$ and $X_3=H$, $X_4=CH_3$ or a $C_2$ to $C_4$ alkyl radical and $Y=\!\!-CH_2-\!\!$ or $-(CH_3)_2C-\!\!$ or, respectively, $X_1$ and $X_3=CH_3$ or a $C_2$ to $C_4$ alkyl radical, $X_2$ and $X_4=H$ or $CH_3$ and $Y=\!\!-CH_2-\!\!$ or $-(CH_3)_2C-\!\!$. It is most preferable for Rac to have the following composition: $X_1$, $X_2$, $X_3$ and $X_4=CH_3$ or a $C_2$ to $C_4$ alkyl radical and $Y=\!\!-CH_2-\!\!$ or $-(CH_3)_2C-\!\!$, preferably $-CH_2-\!\!$. It is most preferable for the radicals $X_1$ to $X_4$ in the abovementioned preferred embodiments to be $CH_3$ if they are not H.

In one particularly preferred embodiment, block (B) has the following composition:
AF3: 40 to 60 mol % $R_3a$, 0 to 10 mol % $R_3b$, 60 to 30 mol % $R_3c$ and also 90 to 100 mol % $R_4a$, 0 to 10 mol % Rata and 0 to 10 mol % $R_4c$.
AF4: 50 mol % $R_3a$, 50 mol % $R_3c$ and also 100 mol % $F_4a$.

The mole percentages stated for AF3 and AF4 relate to the functional groups $R_3$ and $R_4$, respectively, in total, so the amounts of the various units are each selected such that they sum to 100 mol % for each of these groups.

Very particular preference is given to the combinations of the abovementioned AF1 and/or AF2 with AF3 and/or AF4. Combinations of AF1 or AF2 with AF4 are most preferable.

The block lengths n and m of blocks A and B are preferably in the range from 1 to 1000, more preferably in the range from 1 to 500, yet more preferably in the range from 1 to 200, yet still more preferably in the range from 5 to 150, yet still more preferably in the range from 10 to 100, yet still even more preferably in the range from 10 to 50 and most preferably in the range from 10 to 40. The block lengths of blocks A and B may be the same or different. The block-copolyimide may further exhibit some distribution with respect to the particular block lengths of blocks A and B; that is, not all bocks A or all blocks B need to have the same length. The ratio between blocks A and B may thus be varied across a wide range. Proportions in the block copolyimide of the present invention may be from 5 to 90% for block B and from 10 to 95% for block A. Particular preference is given to the ratio of A:B=80:20 or 70:30 or 60:40 or 50:50 or most preferably 45:55.

Details regarding the production of the block-co-polyimides of the second preferred embodiment and further similar polyimides can be extracted from WO 2015/091122, the content of which is hereby explicitly incorporated in the description of the present invention by reference. All polymers described in the examples of WO 2015/091122 are particularly preferred used as polymer (a1.i) in step (a1) of the process of the present invention.

In a third preferred embodiment a polyimide according to U.S. Pat. No. 3,856,752, in particular based on based on BTDA/DAPI (Diaminophenylindane) according to CAS No 104983-64-4 and commercially available as Matrimid 5128, is used as polymer (a1.i).

In step (a), a phase (a2) comprising one or more crosslinker(s) with at least two amino groups (a2.i) is/are used. Said crosslinkers are preferably selected from the group consisting of aliphatic or aromatic amine(s) with at least two amino groups and mixtures thereof.

In a preferred embodiment of the invention aliphatic or aromatic amine(s) with at least two amino groups are used as crosslinker (a2.i) which is/are selected from the group consisting of
substituted or unsubstituted, linear or branched aliphatic amines with 6 to 30 carbon atoms, preferably 6 to 24 carbon atoms, more preferred 6 to 20 carbon atoms and most preferred 6 to 18 carbon atoms comprising
a carbon chain with 5 to 24 carbon atoms, preferably 5 to 20 carbon atoms, more preferred 6 to 18 carbon atoms and most preferred 6 to 15 carbon atoms, and
2 to 5, preferably 2 to 4, more preferred 2 to 3 and most preferred 2 amino groups, preferably primary amino groups,
substituted or unsubstituted cyclic aliphatic amines with 6 to 24 carbon atoms, preferably with the exception of 1,3-diaminocyclohexane and 1,4-diaminocyclohexane. The substituted or unsubstituted cyclic aliphatic amines preferably have 7 to 20 carbon atoms, more preferred 8 to 18 carbon atoms and most preferred 8 to 15 and 2 to 5, preferably 2 to 4, more preferred 2 to 3 and most preferred 2 primary amino groups, optionally comprising heteroatoms in alkyl chains or as linkage between aliphatic rings,
substituted or unsubstituted aromatic or alkyl aromatic amines with 6 to 24 carbon atoms, preferably 7 to 20 carbon atoms, more preferred 8 to 18 carbon atoms and most preferred 8 to 15 and 2 to 5, preferably 2 to 4, more preferred 2 to 3 and most preferred 2 primary amino groups, optionally comprising heteroatoms, and mixtures thereof.

The linear or branched aliphatic amines may be substituted. For example, they might comprise one or more functional groups beside of the amino groups, for example hydroxy groups, carbonyl groups, thiol groups, ester or amide groups. One or more carbon atoms of the aliphatic carbon chain might be replaced by hetero atoms, for example N, O or S, however, at least one fragment of a carbon chain with 5 to 24 carbon atoms, preferred ranges as defined above, which is not interrupted by a hetero atom, must be comprised.

The cycloaliphatic amines may be substituted or unsubstituted. For example, they might comprise one or more functional groups beside of the amino groups, for example hydroxy groups, carbonyl groups, thiol groups, ester or amide groups. Further possible substituents are preferably selected from the group consisting of
- linear or branched alkyl groups with 1 to 6 carbon atoms, preferably 1 to 4, more preferred 1 to 3, even more preferred 1 or 2, most preferred 1 carbon atoms, optionally comprising one or more functional groups, preferably amino or hydroxy groups, most preferred amino groups,
- cycloalkyl or alkyl-cycloalkyl groups with 3 to 18 carbon atoms, preferably 4 to 15, more preferred 5 to 12, even more preferred 6 or 12, carbon atoms, optionally comprising one or more functional groups, preferably amino or hydroxy groups, most preferred amino groups,
- divalent alkyl or cycloalkyl groups that form a fused ring system of two or three alkyl rings.

One or more carbon atoms of the cycloaliphatic rings might be replaced by hetero atoms, for example N, O or S. Preference is given to cycloaliphatic amines comprising maximum one or especially preferred none, heteroatoms in the cycloaliphatic rings.

The aromatic or alkyl aromatic amines may be substituted or unsubstituted, i.e. they might comprise one or more functional groups beside of the amino groups, for example hydroxy groups, hydroxy groups, carbonyl groups, thiol groups, ester or amide groups. Further substituents are preferably linear or branched alkyl or cycloalkyl or alkyl-cycloalkyl groups with 1 to 6 carbon atoms, preferably 1 to 4, more preferred 1 to 3, even more preferred 1 or 2, most preferred 1 carbon atoms, optionally comprising one or more functional groups, preferably amino or hydroxy groups, most preferred amino groups, One or more carbon atoms of the aromatic rings or one of its substituents might be replaced by hetero atoms, for example N, O or S. Preference is given to aromatic amines comprising maximum one or especially preferred none, heteroatoms in the aromatic rings.

As explained further above, it is preferred to use less polar and less water-soluble amine based crosslinker as crosslinkers (a2.i). Use of such crosslinkers (a2.i) leads to the benefits described before and shown further below in the examples.

In another preferred embodiment of the invention aliphatic or aromatic amine(s) with at least two amino groups are used as crosslinker (a2.i) having an octanol-water-partition coefficient log P of equal to or higher than −0.5.

The P value expresses the ratio of the concentrations of one substance in a two-phase system composed of 1-octanol and water, and is reported in the form of the base-ten logarithm as log P (J. Sangster, Octanol-Water Partition Coefficients: Fundamentals and Physical Chemistry, Vol. 2 of Wiley Series in Solution Chemistry, John Wiley & Sons, Chichester, 1997). The octanol-water partition coefficient goes up with increasing fat-solubility and decreasing water-solubility. Particular preference is given to using amine based crosslinkers (a2.i) having an octanol-water partition coefficient log P of equal to or higher than −0.4, more preferred of equal to or higher than −0.3, even more preferred equal to or higher than −0.2 and most preferred of equal to or higher than −0.2 to 3. The upper limit of the log P value depends on the solubility of the crosslinker in the bore liquid and depends of the non-solvent or non-solvent mixture used, on the crosslinker used as well as on the concentration of the crosslinker. Preferably a combination is used wherein the crosslinker is entirely dissolved in the bore solution.

Log P as used in the description, examples and claims of the present invention means a calculated partition coefficient, calculated after input of the structural formula of the respective compound in the program Chem Draw Prime, Version 15.1.0.144, (©1998-2016 PerkinElmer Informatics, Inc.). Chem Draw Prime, Version 15.1.0.144, calculates three different log P values. The log P values referred to in this description, examples and claims are calculated with Chem Draw Prime, Version 15.1.0.144 by using the Crippen's fragmentation: J. Chem. Inf. Comput. Sci., 27, 21(1987). The log P ranges given above and claimed in the claims are defined for the log P values calculated Chem Draw Prime, Version 15.1.0.144, ignoring the standard deviation.

A non-limiting list of preferred crosslinker (a2.i) having an octanol-water-partition coefficient log P of equal to or higher than −0.5 is given in Table 1 below. The table may not be understood as limiting the scope of the application to the listed crosslinkers. Other amine-based crosslinkers having calculated log P values in the above defined ranges can also be used. The log P values given in Table 1 are calculated after input of the structural formula of the respective compound using the program Chem Draw Prime, Version 15.1.0.144, (©1998-2016 PerkinElmer Informatics, Inc.):

TABLE 1

| | Log P |
|---|---|
| Linear or branched aliphatic amines with two or more amino groups | |
| 2-Methylpentanediamine | −0.18 |
| 1,6-Hexamethylenediamine | −0.16 |
| 1,7-Heptamethylenediamine | 0.26 |
| 1,8-Octamethylenediamine | 0.68 |
| 2,4,4-Trimethylhexan-1,6-diamine | 1.04 |
| 1,9-Nonamethylenediamine | 1.09 |
| 2,2,4-Trimethylhexan-1,6-diamine | 1.11 |
| 1,10-Decamethylenediamine | 1.51 |
| 1,11-Undecamethylenediamine | 1.93 |
| 1,12-Dodecamethylenediamine | 2.35 |
| Polyether amines with two or more amino groups | |
| Tripentylenetetraamine | 0.62 |
| Cycloaliphatic and polycyclic amines with two or more amino groups | |
| 1,2-Diaminocyclohexane | −0.44 |
| 2-Methylcyclohexan-1,4-diamine | −0.32 |
| 2,6-Dimethylcyclohexan-1,4-diamine | 0.08 |
| 1,3-Cyclohexanebis(methylamine) | 0.14 |
| TCD-diamine (3(4),8(9)-bis(aminomethyl) tricyclo [$5.2.1.0^{2,6}$] decane) | 0.46 |
| 2,4,6-Trimethylcyclohexan-1,3-diamine | 0.53 |
| N-Cyclohexyl-1,3-propanediamine | 0.62 |
| Isophoronediamine (3,5,5-trimethyl-3-amino-methyl-cyclohexylamine) | 1.05 |
| 4,4'-Diaminodicyclohexylmethane | 1.53 |
| 2,4'-Diaminodicyclohexylmethane | 1.6 |
| 2,2'-Diaminodicyclohexylmethane | 1.67 |
| 3,3'-Dimethyl-4,4'-diaminodicyclohexylmethane | 2.33 |

TABLE 1-continued

| | Log P |
|---|---|
| Aromatic amines with two or more amino groups | |
| Xylylenediamines (bis-aminomethyl-benzene) | 0.12 |
| m- o-,p-Phenylenediamine | 0.43 |
| 2,3-Toluylene diamine | 0.92 |
| 2,4-Toluene diamine | 0.92 |
| 2,6-Toluene diamine | 0.92 |
| 2,4,6-Trimethylphenylene-1,3-diamines | 1.89 |
| 4,4'-Diaminodiphenylether | 1.97 |
| 4,4'-Diaminodiphenylmethane | 2.52 |

Particular preferred are embodiments, wherein the cross-linkers (a2.i) having an octanol-water-partition coefficient log P of equal to or higher than −0.5, more preferred of equal to or higher than −0.4, more preferred of equal to or higher than −0.3, even more preferred equal to or higher than −0.2 and most preferred of equal to or higher than −0.2 to 3 and being selected from the groups defined under "a preferred embodiment of the invention" above.

Even more preferred crosslinkers (a2.i) are used, which are selected from the group consisting of 1,6-Hexamethylenediamine, 1,7-Heptamethylenediamine, 1,8-Octamethylenediamine, 1,9-Nonamethylenediamine, 1,10-Decamethylenediamine, 1,11-Undecamethylenediamine, 1,12-Dodecamethylenediamine, 1,3-Cyclohexanebis(methylamine), 2,2,4-trimethylhexan-1,6-diamine, 2,4,4-trimethylhexan-1,6-diamine, 2-methylpentanediamine, isophoronediamine (3,5,5-trimethyl-3-aminomethyl-cyclohexylamine), 4,4'-diaminodicyclohexylmethane, 2,4'-diaminodicyclohexylmethane 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, TCD-diamine (3(4), 8(9)-bis(aminomethyptricyclo[5.2.1.0$^{2,6}$]decane), xylylenediamines, aromatic amines, o-, m- or p-phenylenediamines, trimethylphenylenediamines, 4,4'-diaminodiphenylmethane, mixtures of the recited diamines also being possible.

Most preferred crosslinkers (a2.i) are used, which are selected from the group consisting of 1,6-Hexamethylenediamine, 1,7-Heptamethylenediamine, 1,8-Octamethylenediamine, 1,9-Nonamethylenediamine, 2,2,4-trimethylhexan-1,6-diamine, 2,4,4-trimethylhexan-1,6-diamine, Decane-1,10-diamine, Dodecane 1,12-diamine, 2-methylpentanediamine, 1,3-Cyclohexanebis(methylamine), mixtures of the recited diamines also being possible.

The crosslinkers (a2.i) comprise at least two amino groups. They might comprise primary, secondary or tertiary amino groups or mixtures thereof. Preferred are primary and secondary amino groups. Most preferred at least one primary amino group is comprised.

According to the present invention, the solvent or solvent mixture (a1.ii) for the polymer (a1.i) preferably comprises a polar aprotic solvent. Suitable polar aprotic solvents are well known in the art and are preferably selected from the group consisting of dimethylsulfoxide (DMSO), dimethylformamide (DMF), dimethylacetamide (DMA), N-methylpyrrolidone (NMP), N-ethylpyrrolidone, sulpholane, tetrahydrofuran (THF). The solvent for the polymer may be a mixture of these polar aprotic solvents.

Preferably, the solvent or solvent mixture (a1.ii) for the polymer (a1.i) comprises 60-100 wt. % of the polar aprotic solvent, more preferably 70-100 wt. %, based on the total weight of the solvent mixture. The polar aprotic solvent may be mixed with 0-40 wt. % of a non-solvent for the polymer (a1.i), more preferably 0-30 wt. % or less, based on the total weight of the mixture but still remains its ability to dissolve the polymer (a1.i).

According to the present invention, the non-solvent or non-solvent mixture (a2.ii) for the polymer (a1.i) preferably comprises a protic solvent. Such solvents are also well known in the art and are preferably selected from the group consisting of water, C1-C6 alkanols (e.g. ethanol), C2-C6 alkanediols (e.g. ethylene glycol), C3-C12 alkanetriols (e.g. glycerol), C4-C20 polyols (e.g. pentaerythritol, ditrimethylolpropane, diglycerol, ditrimethylolethane, trimethylolethane, trimethylolpropane, trimethylolbutane, pentaerthyritol, dipentaerythritol, tripentaerythritol and sorbitol), hydrophilic, preferably water soluble, polymers or copolymers such as polyalkylene polyols and polyvinylpyrrolidone. The non-solvent can be a mixture of non-solvents. Most preferred is water or a mixture of non-solvents plus water.

Preferred polyalkylene polyols are derived from C2-C4 alkylene glycol and they are selected from the group consisting of polyethylene glycol (PEG), polypropylene glycol (PPO), EO-PO diblock polymers, EO-PO triblock polymers, mixed poly(ethylene-propylene glycol) polymers and mixed poly(ethylene-butylene glycol)polymers. A more preferred hydrophilic polymer or copolymer of a C2-C4 alkylene glycol is a hydrophilic polymer having a number average molecular weight of 200 to 5000, more preferably 400 to 3000, especially 400 to 2000. Most preferably, the hydrophilic block is a PEG. Exemplary hydrophilic blocks are PEG200, PEG400, PEG600, Preferably, the non-solvent or non-solvent mixture (a2.ii) comprises 60-100 wt. % of the protic solvent, more preferably 70-100 wt. %, based on the total weight of the non-solvent mixture. The protic solvent can be mixed with 0-40 wt. % of a solvent for the polymer (a1.i), more preferably 0-30 wt. % or less, based on the total weight of the non-solvent mixture, but still remains its ability not to dissolve the polymer (a1.i).

According to the invention, it is preferred that the non-solvent for the polymer is miscible with the solvent for the polymer.

The process according to the present invention is based on liquid-induced phase-separation. Generally, in such a process, a polymer solution and a non-solvent, preferably a non-solvent which is miscible with the solvent for the polymer, are co-extruded through a multi-orifice die and upon contact between the polymer solution and the non-solvent, the solvent is driven out of the polymer phase and at a certain non-solvent concentration the polymer becomes solid.

The process according to the present invention can be performed by using different spinnerets, i.e. a double-orifice spinneret, a triple-orifice spinneret or a quadruple-orifice spinneret. Such spinnerets are known in the art and are disclosed in e.g. WO 93/12868 and WO 2007/007051, incorporated by reference. In a double-orifice spinneret, a phase al is usually extruded through outer annular orifices whereas a phase a2 is extruded through the central annular orifice. In a triple-orifice spinneret, a phase al is extruded through an intermediate orifice whereas a phase a2 is extruded through the central annular orifice and/or through the outer annular orifice, preferably the outer annular orifice. Quadruple-orifice spinnerets likewise enable the production of triple-layer hollow-fibre membranes.

According to a preferred embodiment of the present invention, the phase (a1) composition comprises the polymer (a1.i) and a solvent (a1.ii) for this polymer whereas the phase (a2) composition comprises an amine based crosslinker (a2.i) with at least two amino groups, preferably an aliphatic or aromatic amine with at least two amino groups, and a non-solvent (a2.ii) for the polymer (a1.i).

According another preferred embodiment of the present invention, the phase (a1) composition comprises the polymer (a1.i) and a solvent mixture (a1.ii) for this polymer whereas the phase (a2) composition comprises an amine based crosslinker (a2.i) with at least two amino groups, preferably an aliphatic or aromatic amine with at least two amino groups, and a non-solvent (a2.ii) for the polymer (a1.i). In this second embodiment of the invention, the solvent mixture (a1.ii) for the polymer (a1.i) comprises 60-100 wt. % of solvent(s) for the polymer (a1.i), more preferably 70-99.9 wt. %, based on the total weight of the solvent mixture, and 0-40 wt. % of non-solvent(s) for the polymer (a1.i), more preferably 0.1-30 wt. %, based on the total weight of the solvent mixture.

According to a further preferred embodiment of the present invention, the phase (a1) composition comprises the polymer (a1.i) and a solvent mixture (a1.ii) this polymer whereas the phase (a2) composition comprises an amine based crosslinker (a2.i) with at least two amino groups, preferably an aliphatic or aromatic amine with at least two amino groups, and a non-solvent mixture (a2.ii) for this polymer (a1.i). In this preferred embodiment of the invention, the solvent mixture (a1.ii) in phase (a1) preferably comprises 60-100 wt. % of solvent(s) for the polymer (a1.i), more preferably 70-99.9 wt. %, based on the total weight of solvent(s) mixture, and 0-40 wt. % of non-solvent(s) for the polymer (a1.i), more preferably 0.1-30 wt. %, based on the total weight of the solvent mixture. The non-solvent mixture (a2.ii) for the phase (a2) composition preferably comprises 60-100 wt. % of non-solvent(s) for the polymer (a1.i), more preferably 70-99.9 wt. %, based on the total weight of the non-solvent mixture, and 0-40 wt. % of solvent(s) for the polymer (a1.i), more preferably 0.1-30 wt. %, based on the total weight of the non-solvent mixture.

According still another preferred embodiment of the present invention, the phase (a1) composition comprises the polymer (a1.i) and a solvent (a1.ii) for this polymer whereas the phase (a2) composition comprises an amine based crosslinker (a2.i) with at least two amino groups, preferably an aliphatic or aromatic amine with at least two amino groups, and a non-solvent mixture (a2.ii) for this polymer (a1.i). The non-solvent mixture (a2.ii) for the phase (a2) composition preferably comprises 60-99.9 wt. % of non-solvent(s) for the polymer (a1.i), more preferably 70-99.9 wt. %, based on the total weight of the non-solvent mixture, and 0.1-40 wt. % of solvent(s) for the polymer (a1.i), more preferably 0.1-30 wt. %, based on the total weight of the non-solvent mixture.

Accordingly, the present invention encompasses the following options:

Phase (a1) composition: polymer (a1.i)+solvent for polymer (a1.i); phase (a2) composition: an amine based crosslinker (a2.i) with at least two amino groups, preferably an aliphatic or aromatic amine with at least two amino groups, +non-solvent for the polymer (a1.i).

Phase (a1) composition: polymer (a1.i)+solvent for polymer (a1.i)+non-solvent for the polymer (a1.i); phase (a2) composition: an amine based crosslinker (a2.i) with at least two amino groups, preferably an aliphatic or aromatic amine with at least two amino groups, +non-solvent for the polymer (a1.i).

Phase (a1) composition: polymer (a1.i)+solvent for polymer (a1.i); phase (a2) composition: an amine based crosslinker (a2.i) with at least two amino groups, preferably an aliphatic or aromatic amine with at least two amino groups, +solvent for the polymer (a1.i)+non-solvent for the polymer (a1.i).

Phase (a1) composition: polymer (a1.i)+solvent for polymer (a1.i)+non-solvent for the polymer (a1.i); phase (a2) composition: an amine based crosslinker (a2.i) with at least two amino groups, preferably an aliphatic or aromatic amine with at least two amino groups, +solvent for the polymer (a1.i)+non-solvent for the polymer (a1.i).

A double-orifice spinneret is schematically shown in FIG. 1. When the process according to the present invention is carried out with a double-orifice spinneret, the phase (a1) is extruded through the outer annular orifice (1) whereas the phase (a2) is co-extruded through the central annular orifice (2). The external diameter of the two-material die is preferably in the range from 500 to 800 μm, more preferably in the range from 550 to 750 μm, the internal diameter is preferably in the range from 200 to 400 μm, more preferably from 250 to 350 prn, and pump rate is preferably between 0.1 and 13.5 ml/min.

Figure 2:
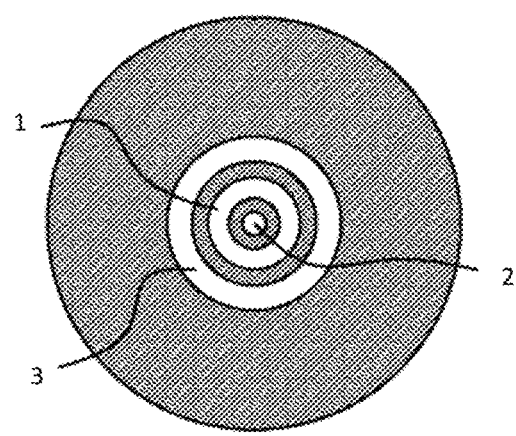
FIG. 2.

A triple-orifice spinneret is schematically shown in FIG. 2. When the process according to the present invention is carried out with a triple-orifice spinneret, the following options are preferred:

Phase (a1) is extruded through the intermediate annular orifice (1)+phase (a2) co-extruded through the outer annular orifice (3)+non-solvent co-extruded through the central annular orifice (2).

Phase (a1) is extruded through the intermediate annular orifice (1)+phase (a2) co-extruded through the central annular orifice (2)+non-solvent co-extruded through the outer annular orifice (3).

Phase (a1) is extruded through the intermediate annular orifice (1)+phase (a2) co-extruded through the central annular orifice (2) and through the outer annular orifice (3).

Phase (a1) is extruded through the intermediate annular orifice (1)+phase (a2) co-extruded through the outer annular orifice (3)+an inert gas, a vapor or an inert liquid co-extruded through the central annular orifice (2).

Phase (a1) is extruded through the intermediate annular orifice (1)+phase (a2) co-extruded through the central annular orifice (2)+an inert gas, a vapor or an inert liquid co-extruded through the outer annular orifice (3).

According to a preferred embodiment of the present invention, the phase (a1) composition comprises in sum about 15% to 35% by weight, preferably 20% to 30% by weight, more preferred 22% to 30% by weight and even more preferred 22% to 29% by weight of the polymer(s) (a1.i) based on the total weight of the phase (a1) composition. The remaining mass of phase (a1) is preferably up with a solvent/solvent mixture (a1.ii) for the polymer (a1.i) and optionally other components like non-solvents to accelerate coagulation. It was found, that an increased content of the polymer (a1.i) in phase (a1) is beneficial to obtain membranes with higher selectivity. If the content, however, is too high the viscosity gets too high and may cause problems for filtration.

According to a preferred embodiment of the present invention, the phase (a2) composition comprises in sum about 0.1% to 30% by weight, preferably 0.5% to 20% by weight, more preferred 1% to 10% by weight and even more preferred 2% to 8% by weight of amine based crosslinkers (a2.i) with at least two amino groups, more preferred aliphatic or aromatic amine(s), and 70% to 99.9% by weight preferably 80% to 99.5% by weight, more preferred 90% to 99% by weight and even more preferred 92% to 98% by weight of non-solvent(s) or a non-solvent mixture (a2.ii), based on the total weight of the mixture of amine based crosslinkers (a2.i) plus non-solvent(s) or non-solvent mixture (a2.ii) in phase (a2). Wherein this non-solvent mixture (a2.ii) comprises 1% to 99% wt., preferably 10% to 95% by weight, more preferred 30% to 90% by weight and even more preferred 50% to 80% by weight of a solvent for the polymer (a1.i), and 1% to 99% by weight, preferably 5% to 90% by weight, more preferred 10% to 70% by weight and even more preferred 20% to 50% by weight of a non-solvent for the polymer (a1.i), based on the total weight of the non-solvent mixture (a2.ii). The amounts of solvent(s) and non-solvent(s) are chosen from the ranges given above in so, that the sum of solvent(s) and non-solvent(s) totals 100% of the weight of the non-solvent mixture. Phase (a2) might consist of an amine based crosslinker with at least two amino groups (a2.i) plus non-solvent or non-solvent mixture (a2.ii) or it may comprise further components like additives.

It is preferred to devolatilize, filter and optionally add additives to phase (a1) before spinning. More preferred phase (a1) is also thermostated—preferably to from 20 to 100° C. and more preferably to from 30 to 70° C. The solution is then gear pumped, for example, through the die. In particular, the devolatilization is important to obtain a defect free membrane.

The preferred distance between the spinning die and a precipitation bath, into which the hollow-fibre is spun in step (b) and an integrally asymmetrical hollow-fibre membrane is formed by precipitating the polymer, is 1 cm to 1 meter, preferably 5 to 60 cm.

As the solvent evaporates on the way between spinning die and precipitation bath on the outer surface of the membrane, the layer densifies in step (b) to form the separating layer on precipitation in the precipitation bath. The thickness of the separating layer can be adjusted via the distance from the spinning die to the precipitation bath and via the atmosphere of the membrane on its way from the spinning die to the precipitation bath.

In a preferred embodiment the membranes obtained by the method according to the present invention to have a high gas permeability, i.e. permeance. For this, the membrane should not have an excessively thick and/or excessively dense separating layer. It is thus, preferred if in the course of the spinning process, after step (a) the hollow thread before entry into the precipitation bath in step (b) is subjected to the flow of a dry thermostated stream of gas or air and/or is passed through a corresponding gas or air atmosphere. It is particularly preferable for the membrane to pass through a gas or air stream. Dry is to be understood as meaning that the gas or air stream is capable of taking up water. Therefore, the air or gas stream preferably has a water content of 0 to 90% relative humidity, preferably of 0 to 50% relative humidity and more preferably of 0 to 30% relative humidity at the particular air/gas temperature.

It is very particularly preferable for the hollow-fibre emerging from the die after step (a) to enter a shaft (tube, chimney) flooded with a dry thermostated gas. Useful gases include: nitrogen, air, argon, helium, carbon dioxide, methane or other industrial inert gases. Gas temperature is adjusted via a heat exchanger and is preferably between 20 and 250° C., more preferably between 25 and 120° C. and most preferably between 30 and 80° C.

Gas velocity in the tube is preferably between 0.1 and 10 m/min, more preferably between 0.3 and m/min, even more preferably between 0.5 and 3 m/min and most preferably between 0.5 and 2 m/min. Tube length is preferably between 1 cm and one meter, more preferably between 2 and 50 cm, even more preferably between 5 and 40 cm and most preferably between 5 and 30 cm. Shaft length, gas velocity and the temperature all have an effect on the thickness of the actual separating layer of the membrane.

As mentioned before, the selection of the amine based crosslinker (a2.i) has an influence on the structure of the membrane and the layer structure. To produce integrally asymmetric membranes with an outer separating layer it is particularly preferred to use a less polar and less water-soluble amine based crosslinker (a2.ii) as defined as preferred crosslinkers above. Such crosslinker preferably diffuses from the bore solution into the wall pores of the hollow-fibre membranes and further on into the polymer in a more even fashion, whereas more polar and water-soluble amine based crosslinker, as used in the prior art, preferably remains in the bore liquid and then diffuse into the polymer only next to the bores.

The fibre spun and preferably conditioned in step (a) then dips in step (b) into a precipitation bath to coagulate the polymer mass and thus form the membrane. Bath temperature is preferably between 1 and 80° C., more preferably between 20 and 70° C. and most preferably between 40 and 65° C.

The concentration of aprotic dipolar and other solvents such as, for example but not limited to dimethylformamide, dimethylacetamide, N-methylpyrrolidone, N-ethylpyrrolidone, sulpholane, dimethyl sulphoxide, tetrahydrofuran, dioxane, isopropanol, ethanol or glycerol in the precipitation bath is preferably between 0.01% by weight and 20% by weight, more preferably between 0.1% by weight and 10% by weight and most preferably between 0.2% by weight and 1% by weight, the remainder being water. It is likewise preferable to use pure water in the water bath.

The haul-off speed of the hollow fibres is preferably between 2 and 100 m/min, more preferably between 10 and 80 m/min and most preferably between 30 and 70 m/min. It was found that an excessively high haul-off speed leads to a loss of permeance. Nonetheless, the method which is preferred according to the present invention may preferably be operated at a high haul-off speed to thereby achieve improved productivity compared with the prior art.

The fibres are preferably washed at a point downstream of the precipitation bath until the residual solvent content is below 1% by weight, preferably not more than 0.5% by weight. Various techniques of washing can be used for this. It is preferable to use a continuous process whereby the fibres pass through one or more successive water baths. It is particularly preferable to heat the water baths to 40 to 90° C., preferably 50 to 80° C., to achieve a more effective wash.

However, it is also possible for the fibres obtained from the precipitation bath to be wound up and be washed in water off-line. The wash can take place at any temperature. Preferably, however, comparatively high temperatures are used for the wash as described above. It is preferable to direct the water in cross-flow along the fibres, i.e. to force it from the inside surface to the outside.

This is preferably followed by a solvent exchange, more preferably in isopropanol and/or hexane, to remove water and DMF. The solvent exchange can be carried out as a continuous operation (on-line) or off-line, like the wash. For an on-line solvent exchange, the fibres are led through one or more solvent baths, preferably downstream of the wash bath(s).

The fibres are then dried in step (c), preferably at a temperature in the range from room temperature and 150° C., more preferably between 50 and 100° C., removing isopropanol and hexane. The overall water and/or residual solvent content after drying is in the range from 0% to 5% by weight, preferably <3% by weight and more preferably in the range from 0.1% to 3% by weight, and preferably consists of the water, isopropanol and hexane fractions.

Too much water can lead to hydrolysis and hence chain scissioning and thus to a mechanically unstable membrane. Although some of the water and some of the solvent will evaporate during annealing, it has been determined that the maximum content before commencement of annealing is advantageously below 5% by weight, preferably below 3% by weight.

In step (d) the hollow-fibre membrane obtained from step (c) are subjected to a thermal treatment at an annealing temperature of 150 to 280° C., preferably 160 to 270° C., more preferred 160 to 260° C., even more preferred 170 to 250° C., particular preferred 170 to 240° C. and most preferred 180 to 230° C.

The conditions during thermal treatment can be varied according to the property desired for the membranes. If the annealing temperature is too low or too high, the degree of crosslinking, i.e. the insolubility in DMF is too low. It has been found that if a very high degree of crosslinking and thus chemical stability is desired, an optimum annealing temperature for step (d) in the process of the invention is in the range of 180 to 230° C.

It has further been found that the mechanical stability of the membranes, in particular the elongation at break gets worse if the annealing temperature during step (d) is too high.

The gas selectivity and permeability of the membranes can also be influenced and controlled by choosing an appropriate annealing temperature in step (d). While a higher annealing temperature leads to a better selectivity, the permeability goes down.

The examples proffered hereinbelow make it clear to a person skilled in the art which variation made has which effect on the product properties and how he or she may establish which property.

The duration of the temperature treatment in step (d)—from the time at which the target temperature for is reached—has minor influence on the membrane performance compared to the annealing temperature. Nevertheless, as shown in the examples, some properties like for example gas selectivity, permeance and insolubility can also be influences ad controlled by the time of heat treatment in step (d). Preferably heat treatment in step (d) is done for 15 to 300 min, more preferably for 30 to 240 min, even more preferably for 30 to 90 and most preferably for 60 to 90 min.

The heating rate chosen to attain the heat treatment temperature in step (d) is preferably at from about 35° C. in the range from 0.1 to 10° C./min, more preferably 1 to 5° C./min and most preferably in the range from 1 to 2° C./min in order that annealing may take place uniformly everywhere in the membrane bundle and in order that the final temperature may be attained at the same time. Particularly with the concurrent annealing of large amounts of fibres, a comparatively slow heating rate is advantageous in order that uniform annealing of the fibres may be ensured.

The annealing temperature, i.e. the atmosphere surrounding the membrane at a distance of up to 10 cm, preferably 2 to 10 cm, is measured with 3 or more sensors, preferably thermocouples. The mandated distance relates to the distance from the outer surface of the membrane when only one membrane is being annealed. When two or more membranes are being annealed concurrently, as for example with a membrane bundle or a stacked arrangement of membranes, the distance relates to the outer surface of a membrane fully on the outside, i.e. the distance to the outer surface of the membrane bundle or another membrane arrangement.

The mechanical properties of the membranes and their productivity in particular have been found to be particularly good when the oxygen content of the atmosphere surrounding the membrane at a distance of up to 10 cm, preferably 2 to 10 cm, does not exceed a certain maximum value during the anneal. Preferably, therefore, the heat treatment takes place at an oxygen content of not more than 0.5% by volume, more preferably at not more than 0.25% by volume, even more preferably at not more than 0.1% by volume and yet even more preferably at not more than 0.01% by volume.

Particularly good results are obtained on annealing the membranes in a gas atmosphere or a gas stream of correspondingly low oxygen content and not only in a vacuum. Without wishing to be tied to any one theory, inventors believe that the gas atmosphere and/or gas stream ensures a uniform distribution of temperature in the membrane bundle to be annealed and hence uniform annealing of all membranes.

Therefore, the membranes are preferably surrounded by an atmosphere of correspondingly low oxygen content during the anneal and preferably at least in the first phase of cooling down, more preferably also during the annealing up and/or to the end of the cooling down step. It is very particularly preferable for the membrane to be subjected during the abovementioned phases to a flow of a gas or gas mixture or gas stream or stream of a gas mixture, more preferably of at least one inert gas, for example a noble gas or nitrogen or sulphur hexafluorides or even more preferably nitrogen, having the abovementioned low oxygen content. It is most preferable to use a corresponding gas stream. During cooling, i.e. as soon as the temperature has dropped permanently below the maximum annealing temperature, it is also possible to apply a vacuum.

It is particularly preferable when after the beginning of the cooling down to temperatures of below 150° C. the atmosphere surrounding the membrane at a distance of up to 10 cm, preferably 2 to 10 cm corresponds to the gas atmosphere described above and/or a vacuum is drawn. At lower temperatures, in particular below 150° C., the reactivity of the membranes is so low that contact with an oxygen-richer atmosphere would generally no longer cause any damage.

Cooling the membranes after heat treatment phase (d) can be "passive", i.e. by switching off the heat source. However, it is particularly preferable for the membranes which have been completely annealed to be cooled down "actively", for example by flushing the oven or contacting the membrane with an appropriately temperature-regulated inert gas having the hereinbelow specified $O_2$ content. Alternatively, however, it is likewise preferable to cool with a heat exchanger and/or a cooling circuit. Further technical modulations to effectuate appropriate cooling are known to one skilled in the art and are encompassed by the present invention. Active cooling enhances the space-time yield and reduces the risk of yet still incurring an undesirable deterioration in membrane properties during cooling.

It may be preferable in the method of the present invention to treat the membranes with a silicone-type elastomer such as, for example, Sylgard® 184 after drying to repair possible defects. Another embodiment of the present invention are hollow-fibre membranes obtainable by the process according to the invention. The fibres of the invention preferably are integrally asymmetrical hollow-fibre membranes.

The degree of crosslinking of the polymer of the fibres can be controlled but preferably is very high. It can be measured by immersing the membranes in DMF at 25° C. for 24 h under steering. The undissolved matter is filtered, dried and weight. No undissolved matter corresponds to 100% degree crosslinking, full dissolution corresponds to 0% crosslinking. Preferably the membranes of the present invention have at least 85% degree of crosslinking, more preferred 90 to 100%, even more preferred 95 to 100%.

Figure 3A:
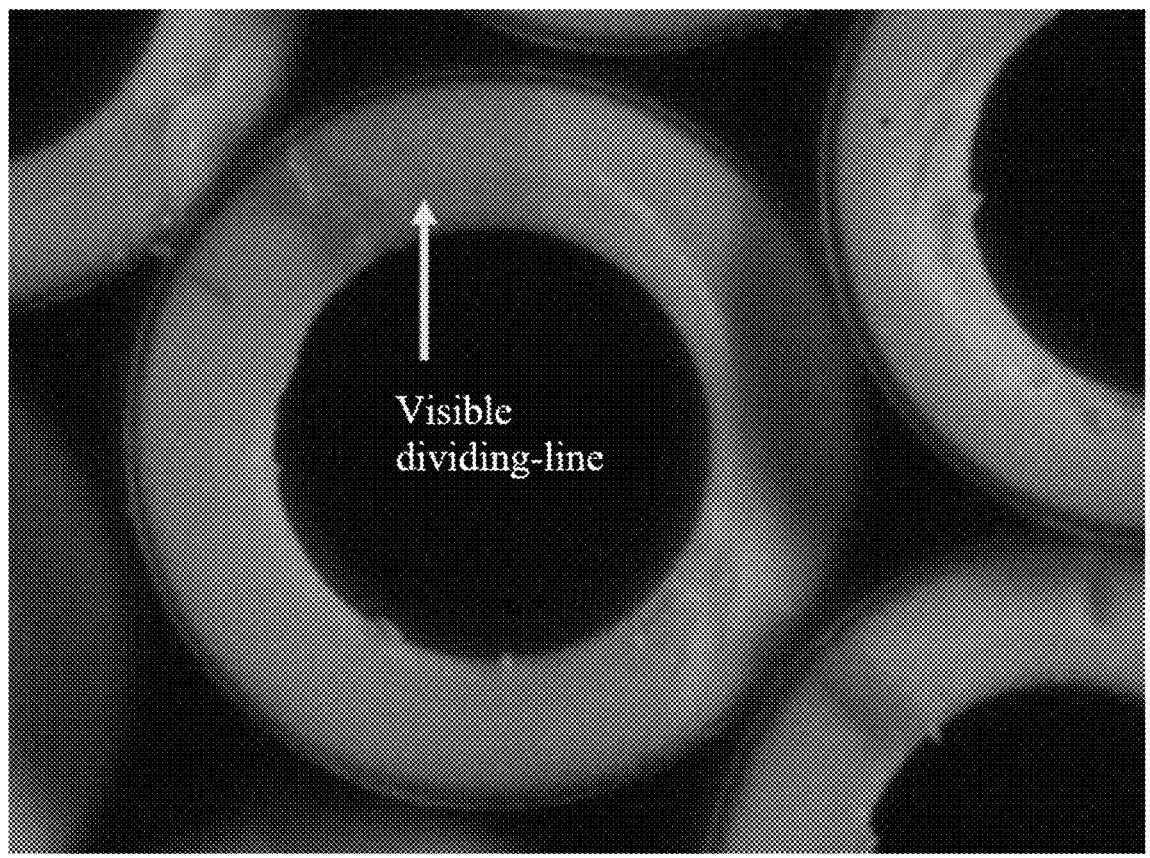
Figure 3B:
FIG. 3b.

The crosslinked-hollow-fibre membranes of the invention, comprise
- a polymer selected from the group consisting of polyimides, co-polyimides, block-copolyimides, polyetherimides, polyamidoimides, or mixtures or blends thereof, and
- an amine based crosslinker, preferably an aliphatic or aromatic amine, with at least two amino groups, and have a dense crosslinked outer layer as well as a homogeneous and crosslinked inner support layer. "Homogeneous and crosslinked inner support layer" means that only one layer is visible in scanning electron microscope images of the front side of the hollow fibres, at a magnification of 300×, between the dense outer layer, which is not visible in this magnification, and the inner surface of the hollow fibres. An example for an inventive membrane with a homogeneous support layer is shown in FIG. 3b while a membrane with a non-homogeneous inner layer structure, i.e. with two visible inner layers and a clearly visible dividing-line between the two layers is shown in FIG. 3a. The structure according to FIG. 3a has less mechanical stability because of the weak connection between the two layers at the visible dividing line. Inventive membranes having a homogeneous structure are beneficial in view of their mechanical stability. In addition, the hollow fibres of the invention having a crosslinked inner layer, i.e. not only the dense outer layer but also the inner layer is crosslinked, and are, thus, widely insoluble.

Preferred polymers and amine based crosslinkers, that may be comprised in crosslinked-hollow-fibre membrane according to the invention, are those defined as preferred embodiments for the process of the invention above.

The crosslinked-hollow-fibre membrane of the invention are preferably integrally asymmetric hollow-fibre membrane. They are obtainable by the process according to the invention. The hollow-fibre membranes according to the present invention are particularly useful for gas separation processes, vapor separation processes and liquid filtration processes.

Analytic Methods

Permeabilities

Permeances of hollow-fibre membranes to gases are reported in GPU (Gas Permeation Unit, $10^{-6}$ cm$^3 \cdot$cm$^{-2} \cdot$s$^{-1} \cdot$cmHg$^{-1}$).

Permeance P/I (since the thickness of the separating layer is unknown) is computed by the following formula:

$$P/l = \frac{Q(STP)}{R \cdot T \cdot A \cdot \Delta p} \cdot 10^6$$

P/I . . . permeance in GPU (gas permeation units. $10^{-6}$ cm$^3$ cm$^{-2} \cdot$s$^{-1} \cdot$cmHg$^{-1}$)
Q . . . gas flux of permeate side in cm$^3$ (STP)/s
R . . . gas constant in cm$^3 \cdot$cmHg$\cdot$K$^{-1} \cdot$mol$^{-1}$
T . . . temperature in kelvins (room temperature, ~23° C.)
A . . . external area of hollow-fibre in cm$^2$ (between 60 and 80 cm$^2$)
Δp . . . pressure difference between feed and permeate side in cmHg
dp/dt . . . pressure rise per time on permeate side in cmHg$\cdot$s$^{-1}$ The selectivities of various pairs of gases are pure-gas selectivities. The selectivity between two gases calculates from the ratio of permeabilities:

$$S = \frac{P_1}{P_2}$$

S . . . ideal gas selectivity
P$_1$ . . . permeability or permeance of gas 1
P$_2$ . . . permeability or permeance of gas 2

Determination of Residual Solvent Content

The residual solvent (e.g. isopropanol, hexane) is determined via gas chromatography by headspace injection of the polymer dissolved/dispersed in 1,3-dimethyl-3,4,5,6-tetrahydro-2(1H)-pyrimidinone (DMPU).

A 250-300 mg quantity of the sample is weighed out accurately to 0.1 mg (=initial weight) into a tared vial. Then, 5.00 ml of DMPU are added using a full pipette or a Dispensette and the vial is sealed with the septum using the cap crimper. The sample is thermostated to 120° C. in the headspace sampler for 90 min, which is followed by headspace injection onto the GC column.

Residual DMF of the moist hollow-fibre sample is determined by Soxhlet extraction in ethanol. Subsequent quantification is by direct injection of the extract onto GC. Residual DMF of the dry hollow-fibre sample is determined using headspace GC.

GC: Perkin Elmer AutoSystem XL
Column: Perkin Elmer WAX ETR, 30 m×0.53 mm, df=2.00 μm, #N931-6570
Headspace autosampler: Perkin Elmer TurboMatrix 40
Carrier gas: 5 ml helium 4.6 (or better)
FID detector gases: 40 ml/minute hydrogen, 400 ml/min synthetic air
Temperature programme of GC:
Init.temp.: 175° C. for 3 minutes,
Ramp1: 20°/min to 230° C. for 3 minutes
Run time: 8.75 minutes
Cycle time: 15 minutes After effected analysis, the residual solvent content is automatically computed according to the formula $$\frac{\text{area}}{\text{cal.curve} \cdot \text{initial weight [mg]}} \cdot 100 = \text{residual solvent}(\%)$$

and printed out under "Concentration [%]".

Determination of Residual Water Content

Residual water content is determined by extracting the membranes with isopropanol and a subsequent analysis by Karl Fischer titration. The membranes are transferred into a previously dried 250 ml Schott glass and covered with a weighed-out amount of dry isopropanol up to the top. The container is left to stand at room temperature overnight.

Tensile Strength and Elongation at Break

The tensile strength and elongation at break are tested using Zwick Z050 static materials testing machine. The values obtained is an average of 10 readings from 10 individual hollow fibres. The following are the set parameters:

TABLE 2

| | |
|---|---|
| Clamping length | 200 mm |
| Preload | 0.1N |
| Preload velocity | 20 mm/min |
| Test velocity | 50 mm/min |
| Loading threshold for cut-off | 80% $F_{max}$ |
| Loading threshold at fracture | 0.5N |

The tensile strength is recorded when the elongation is no longer linear to applied load. The elongation at break is recorded the change in length of hollow fibres before they fractured.

EXAMPLES

The examples below are intended to illustrate and describe the present invention in more detail but shall not be construed to limit it in any way.

Chemical Used:
Polymers (a1.i):
PI 1: P84 HT prepared according to Example 7 of WO2011009919
Co-PI: A block-co-polyimide with
  Block A: BTDA/PMDA-TDI
  Block B: BTDA/PMDA-MesDA
  Ratio A:B 80:20
  was prepared according to example 40 of WO 2015/091122 with a block ratio of 80:20 instead of 75:25:
Crosslinkers (A2.i)

TABLE 3

| Shortcut | Compound | Supplier | Calculated Log P |
|---|---|---|---|
| PEI | Polyethylenimine | Sigma Aldrich | −6 |
| HMD | hexamethylenediamine | Sigma Aldrich | −0.16 |
| TMD | Vestamine TMD, Mixture of (2,2,4-trimethylhexane-1,6-diamine & 2,4,4-trimethyl-hexane-1,6-diamine) | Evonik Industries | 1.07 |
| DDA | Decane-1,10-diamine | Sigma Aldrich | 1.51 |
| IPDA | Isophoronediamine (3,5,5-trimethyl-3-aminomethyl-cyclohexylamine) | Evonik | 1.05 |

Solvent:
DMF Dimethylformamide obtained from BASF.
Non-Solvent:
Water

Example 1: Generic Description of the Membrane Production Process

To produce the phase (a) solution, the polymer (a1.i) was dissolved in a solvent. The solution was devolatilized, thermostated to 50° C. and gear pumped through a two-material die. The flow rate was 324 g/h. While the polymer solution (a1) was conveyed in the outer region of the two-material die, a phase (a2), consisting of a non-solvent (a2.ii) for polymer (a1.i) and a diamine crosslinker (a2.i) was conveyed as bore solution in the inner region in order to produce the hole in the hollow fibres. The flow rate of the bore solution was 120 ml/h. After a distance of 13 cm from the die, the hollow-fibre entered a coagulation bath containing warm water at 50° C. The hollow-fibre travelled through a tube on the way from the die to the precipitation bath. This tube was flooded with a 0.90 l/min stream of nitrogen, tube internal temperature was 35° C. The fibre was hauled through the water wash bath and finally wound up at a speed of 40 m/min. After extraction with water for several hours, the hollow fibres were dipped into isopropanol. After solvent exchange, the membranes were led at 70° C. through a drying zone and dried within about 50 seconds. The membranes obtained were heated to the desired annealing temperature in a vacuum of 30 mbar absolute (N2 flushed, $O_2$ content <0.001% by volume) and subsequently left at the final temperature for the desired time.

The materials used as polymer (a1.i), diamine crosslinker (a2.i), solvents (a1.ii), non-solvents (a2.ii), the compositions of phases (a1) and (a2), the annealing temperature and the annealing time are given in the respective examples and comparative examples below.

Example 2: Influence of the Amount of Diamine Crosslinker (a2.i) on the Degree of Crosslinking (Insolubility in DMF) of the Membranes Hollow-fibre membranes were produced according to Example 1 according to the parameters given in Table 4.

TABLE 4

| | Comparative Example 1 | Example 2.1 | Example 2.2 | Example 2.3 |
|---|---|---|---|---|
| polymer (a1.i) | PI1 | PI1 | PI1 | PI1 |
| diamine crosslinker (a2.i) | None | TMD | TMD | TMD |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.63:0 | 1:2.63:0 | 1:2.63:0 | 1:2.63:0 |
| Composition phase (a2) as weight ratio of solvent:non-solvent:(a2.i) | 1:0.42:0 | 1:0.42:0.01 | 1:0.42:0.04 | 1:0.42:0.07 |
| annealing temperature [° C.] | 250 | 250 | 250 | 250 |
| annealing time [min] | 60 | 60 | 60 | 60 |
| Insolubility in DMF [%] | 4.9 | 38.6 | 74.7 | 87.5 |

The analytic results in Table 4 show that the degree of crosslinking can be varied over a wide range with the process of the invention.

Example 3: Influence of the Polarity of the Diamine Crosslinker (a2.i) and the Annealing Temperature on the Membrane Structure and Properties Hollow-fibre membranes were produced according to Example 1 according to the parameters given in Table 5.

TABLE 5

|  | Comparative Example 2 | Example 3 | Comparative Example 3.1 | Example 3.2 |
|---|---|---|---|---|
| polymer (a1.i) | PI 1 | PI 1 | PI 1 | PI 1 |
| diamine crosslinker (a2.i) | PEI | PEI | TMD | TMD |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.63:0 | 1:2.63:0 | 1:2.63:0 | 1:2.63:0 |
| Composition phase (a2) as as weight ratio of solvent:non-solvent:(a2.i) | 1:0.42:0.07 | 1:0.42:0.07 | 1:0.42:0.07 | 1:0.42:0.07 |
| annealing temperature [° C.] | No annealing | 200 | No annealing | 200 |
| annealing time [min] | — | 60 | — | 60 |
| Insolubility in DMF [%] | 82 | 79 | 47 | 74 |
| Formation of two layers | Yes | Yes | No | No |
| Tension [N] | 1.52 | 1.36 | 1.48 | 1.47 |
| Elongation [%] | 26.82 | 11.03 | 25.62 | 17.86 |

The results of Table 5 show that the degree of crosslinking after annealing was on a comparable level if polyethyleneimine, with a very low log P value, was used as crosslinker. If, however, TMD, with a high log P value, was used as crosslinker, the process of the invention allows a flexible adjustment of the crosslinking degree.

Further, as shown in FIG. 3a, the use of polyethyleneimine as crosslinker lead to the formation of an inner dense layer close to the lumen surface of the hollow fibres. This structure can be a risk of failure and can lead to delamination of the membranes. If the preferred crosslinker TMD was used, formation of an inner dense layer could be avoided, and a homogeneous membrane was obtained as shown in FIG. 3b.

Table 5 also shows that use of a crosslinker having higher octanol/water partition coefficient log P lead to hollow-fibre membranes with better mechanical properties after heat treatment of the crosslinked membranes. As will be shown below, heat treatment is necessary to obtain a good selectivity of the membranes.

Example 4: Influence of the Annealing Temperature in Step (d) on Performance, Chemical and Mechanical Stability of the Membranes Hollow-fibre membranes were produced according to Example 1 according to the parameters given in Table 6.

TABLE 6

|  | Example 4.1 | Example 4.2 | Example 4.3 | Example 4.4 |
|---|---|---|---|---|
| polymer (a1.i) | PI 1 | PI 1 | PI 1 | PI 1 |
| diamine crosslinker (a2.i) | TMD | TMD | TMD | TMD |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.63:0 | 1:2.63:0 | 1:2.63:0 | 1:2.63: 0 |
| Composition phase (a2) as weight ratio of solvent:non-solvent:(a2.i) | 1:0.42:0.07 | 1:0.42:0.07 | 1:0.42:0.07 | 1:0.42:0.07 |
| annealing temperature [° C.] | 150 | 200 | 250 | 280 |
| annealing time [min] | 60 | 60 | 60 | 60 |
| Insolubility in DMF [%] | 56.3 | 80.3 | 82 | 78.3 |
| Tension [N] | 1.78 | 1.94 | 1.87 | 1.98 |
| Elongation [%] | 22.03 | 18.21 | 13.81 | 11.84 |
| Permeance $O_2$ [GPU] | — | 48.7 | 10.6 | 4.3 |
| Selectivity $O_2/N_2$ | — | 2.5 | 4.3 | 6.9 |

The results in Table 6 show the influence of the annealing temperature in step (d). While selectivity and tension are improved with increasing temperatures, permeance and elongation decrease if the annealing temperature is increased. For the chemical resistance (insolubility in DMF) an optimum can be reached at temperatures between 200 and 250° C.

Example 5: Influence of Duration of Annealing in Stems (d) on Performance, Chemical and Mechanical Stability of the Membranes Hollow-fibre membranes were produced according to Example 1 according to the parameters given in Table 7.

TABLE 7

|  | Example 5.3 | Example 5.4 |
| --- | --- | --- |
| polymer (a1.i) | PI 1 | PI 1 |
| diamine crosslinker (a2.i) | TMD | TMD |
| solvent | DMF | DMF |
| non-solvent | $H_2O$ | $H_2O$ |
| Composition phase (a1) as weight ratio of (a1.i):solvent:non-solvent | 1:2.63:0 | 1:2.63:0 |
| Composition phase (a2) as weight ratio of solvent:non-solvent:(a2.i) | 1:0.42:0.07 | 1:0.42:0.07 |
| annealing temperature [° C.] | 270 | 270 |
| annealing time [min] | 60 | 90 |
| Insolubility in DMF [%] | 88 | 87 |
| Tension [N] | 1.6 | 1.5 |
| Elongation [%] | 15.4 | 15.4 |
| Permeance $O_2$ [GPU] | 11.9 | 10.6 |
| Selectivity $O_2/N_2$ | 7.1 | 7.0 |

Table 7 shows that the duration of annealing in step (d) has a small impact on the properties of the membranes.

Example 6: Comparison of the Effect of Different Crosslinkers (a2.i) on the Mechanical Properties and Chemical Resistance of the Obtained Membranes Hollow-fibre membranes were produced according to Example 1 according to the parameters given in Tables 8.1 to 8.6.

TABLE 8.1

|  | Comparative Example 4 | Comparative Example 5 | Comparative Example 6 | Comparative Example 7 |
| --- | --- | --- | --- | --- |
| polymer (a1.i) | Co-PI | Co-PI | Co-PI | Co-PI |
| diamine crosslinker (a2.i) | None | None | None | None |
| solvent | DMF | DMF | DMF | DMF |
| non-solvent | $H_2O$ | $H_2O$ | $H_2O$ | $H_2O$ |
| Composition phase (a1) as weight ratio of (a1.i) solvent:non-solvent | 1:2.77:0 | 1:2.77:0 | 1:2.77:0 | 1:2.77:0 |
| Composition phase (a2) as weight ratio of solvent:non-solvent:(a2.i) | 1:0.43:0 | 1:0.43:0 | 1:0.43:0 | 1:0.43:0 |
| annealing temperature [° C.] | No annealing | 150 | 200 | 250 |
| annealing time [min] | No annealing | 60 | 60 | 60 |
| Insolubility in DMF [%] | 0 | 0 | 0 | 0 |
| Tension [N] | 1.4 | 1.3 | 1.2 | 1.2 |
| Elongation [%] | 29.1 | 19.7 | 13.2 | 13.5 |

TABLE 8.2

|  | Example 6.2.1 | Example 6.2.2 | Example 6.2.3 | Example 6.2.4 |
| --- | --- | --- | --- | --- |
| polymer (a1.i) | Co-PI | Co-PI | Co-PI | Co-PI |
| diamine crosslinker (a2.i) | PEI | PEI | PEI | PEI |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.77:0 | 1:2.77:0 | 1:2.77:0 | 1:2.77:0 |
| Composition phase (a2) as weight ratio of solvent:non-solvent:(a2.i) | 1:0.42:0.07 | 1:0.42:0.07 | 1:0.42:0.07 | 1:0.42:0.07 |
| annealing temperature [° C.] | No annealing | 150 | 200 | 250 |
| annealing time [min] | No annealing | 60 | 60 | 60 |
| Insolubility in DMF [%] | 87 | 79 | 81 | 66 |
| Tension [N] | 1.5 | 1.3 | 1.2 | 1.1 |
| Elongation [%] | 25.8 | 16.2 | 10.8 | 5.6 |

TABLE 8.3

|  | Example 6.3.1 | Example 6.3.2 | Example 6.3.3 | Example 6.3.4 |
| --- | --- | --- | --- | --- |
| polymer (a1.i) | Co-PI | Co-PI | Co-PI | Co-PI |
| diamine crosslinker (a2.i) | HMD | HMD | HMD | HMD |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.77:0 | 1:2.77:0 | 1:2.77:0 | 1:2.77:0 |
| Composition phase (a2) as weight ratio of solvent:non-solvent:(a2.i) | 1:0.42:0.07 | 1:0.42:0.07 | 1:0.42:0.07 | 1:0.42:0.07 |
| annealing temperature [° C.] | No annealing | 150 | 200 | 250 |
| annealing time [min] | No annealing | 60 | 60 | 60 |
| Insolubility in DMF [%] | 80 | 90 | 100 | 91 |
| Tension [N] | 1.4 | 1.3 | 1.3 | 1.2 |
| Elongation [%] | 26 | 20 | 16.5 | 10.9 |

TABLE 8.4

|  | Example 6.4.1 | Example 6.4.2 | Example 6.4.3 | Example 6.4.4 |
| --- | --- | --- | --- | --- |
| polymer (a1.i) | Co-PI | Co-PI | Co-PI | Co-PI |
| diamine crosslinker (a2.i) | TMD | TMD | TMD | TMD |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.77:0 | 1:2.77:0 | 1:2.77:0 | 1:2.77:0 |
| Composition phase (a2) as weight ratio of solvent:non-solvent: (a2.i) | 1:0.42:0.07 | 1:0.42:0.07 | 1:0.42:0.07 | 1:0.42:0.07 |
| annealing temperature [° C.] | No annealing | 150 | 200 | 250 |
| annealing time [min] | No annealing | 60 | 60 | 60 |
| Insolubility in DMF [%] | 43 | 68 | 95 | 87 |
| Tension [N] | 1.4 | 1.3 | 1.3 | 1.2 |
| Elongation [%] | 25.5 | 22.7 | 17.8 | 13.2 |

TABLE 8.5

|  | Example 6.5.1 | Example 6.5.2 | Example 6.5.3 | Example 6.5.4 |
| --- | --- | --- | --- | --- |
| polymer (a1.i) | Co-PI | Co-PI | Co-PI | Co-PI |
| diamine crosslinker (a2.i) | DDA | DDA | DDA | DDA |
| solvent | DMF | DMF | DMF | DMF |
| non-solvent | $H_2O$ | $H_2O$ | $H_2O$ | $H_2O$ |
| Composition phase (a1) as weight ratio of (a1.i):solvent:non-solvent | 1:2.77:0 | 1:2.77:0 | 1:2.77:0 | 1:2.77:0 |
| Composition phase (a2) as weight ratio of solvent:non-solvent:(a2.i) | 1:0.42:0.07 | 1:0.42:0.07 | 1:0.42:0.07 | 1:0.42:0.07 |
| annealing temperature [° C.] | No annealing | 150 | 200 | 250 |
| annealing time [min] | No annealing | 60 | 60 | 60 |
| Insolubility in DMF [%] | 42 | 57 | 96 | 87 |
| Tension [N] | 1.3 | 1.3 | 1.3 | 1.2 |
| Elongation [%] | 21.8 | 21.2 | 19.4 | 13.8 |

TABLE 8.6

|  | Example 6.6.1 | Example 6.6.2 | Example 6.6.3 | Example 6.6.4 |
| --- | --- | --- | --- | --- |
| polymer (a1.i) | Co-PI | Co-PI | Co-PI | Co-PI |
| diamine crosslinker (a2.i) | IPDA | IPDA | IPDA | IPDA |
| solvent | DMF | DMF | DMF | DMF |
| non-solvent | $H_2O$ | $H_2O$ | $H_2O$ | $H_2O$ |

TABLE 8.6-continued

|  | Example 6.6.1 | Example 6.6.2 | Example 6.6.3 | Example 6.6.4 |
|---|---|---|---|---|
| Composition phase (a1) as weight ratio of (a1.i):solvent:non-solvent | 1:2.77:0 | 1:2.77:0 | 1:2.77:0 | 1:2.77:0 |
| Composition phase (a2) as weight ratio of solvent:non-solvent:(a2.i) | 1:0.42:0.07 | 1:0.42:0.07 | 1:0.42:0.07 | 1:0.42:0.07 |
| annealing temperature [° C.] | No annealing | 150 | 200 | 250 |
| annealing time [min] | No annealing | 60 | 60 | 60 |
| Insolubility in DMF [%] | 18 | 50 | 78 | 92 |
| Tension [N] | 1.6 | 1.3 | 1.3 | 1.4 |
| Elongation [%] | 23.3 | 7.9 | 7.5 | 6.9 |

Tables 8.1 to 8.6 show that the process of the invention, where chemical crosslinking is occurring during the phase invention process (hollow-fibre formation in step (a)), by choosing the crosslinking-agent according to its polarity, can provide control of the crosslinking process.

Using less polar and less water-soluble amine based crosslinkers, having a higher log P (>−0.5), allows better control of the crosslinking process. The degree of crosslinking can further be improved by a moderate thermal treatment in at temperatures of 150-250° C.

The invention claimed is:

1. A process for manufacturing a hollow-fibre membrane, comprising:
  (a) spinning a hollow-fibre membrane by:
    (a1) extruding through an orifice of a hollow-fibre die a phase (a1) composition comprising:
      (a1.i) a polymer selected from the group consisting of: polyimides, copolyimides; block-copolyimides; polyetherimides; polyamidoimides; and mixtures and blends thereof; and
      (a1.ii) a solvent or a solvent mixture for said polymer (a1.i);
    (a2) co-extruding through a central orifice of the hollow-fibre die and/or through an outer orifice of a hollow-fibre die a phase (a2) composition comprising:
      (a2.i) an amine based crosslinker, with at least two amino groups;
      (a2.ii) a non-solvent or a non-solvent mixture for the polymer (a1.i);
  (b) passing the hollow-fibre membrane through a coagulation bath;
  (c) drying the hollow-fibre membrane to an overall water and/or residual solvent content of from 0% to 5% by weight;
  (d) thermally treating the hollow-fibre membrane at an annealing temperature of 150 to 280° C.; wherein annealing takes place in a surrounding atmosphere with less than 0.5% oxygen by volume.

2. The process of claim 1, wherein the amine based crosslinker (a2.i) is an aliphatic or aromatic amine.

3. The process of claim 1, wherein the hollow-fibre die is a double-orifice spinneret, a triple-orifice spinneret or a quadruple-orifice spinneret.

4. The process of claim 3, wherein the die is a spinneret with annular orifices.

5. The process of claim 1, wherein the phase (a1) composition comprises in sum 15% to 35% by weight of the polymer (a1.i) based on the total weight of the phase (a1) composition.

6. The process of claim 1, wherein the phase (a2) composition comprises in sum 0.1% to 30% by weight of an amine based crosslinker (a2.i) with at least two amino groups based on the total weight of the composition (a2).

7. The process of claim 1, wherein the amine based crosslinker (a2.i) comprises an octanol-water-partition coefficient log P equal to or higher than −0.5.

8. The process of claim 2, wherein the aliphatic and/or aromatic amine with at least two amino groups (a2.i), is selected from the group consisting of:
  substituted or unsubstituted, linear or branched aliphatic amines with 6 to 30 carbon atoms, comprising:
    a carbon chain with 5 to 24 carbon atoms; and
    2 to 5 amino groups;
  substituted or unsubstituted cyclic aliphatic amines with 6 to 24 carbon atoms, optionally comprising heteroatoms in alkyl chains or as a linkage between aliphatic rings;
  substituted or unsubstituted aromatic or alkyl aromatic amines with 6 to 24 carbon atoms, optionally comprising heteroatoms; and mixtures thereof.

9. The process of claim 8, wherein the aliphatic and/or aromatic amine with at least two amino groups (a2.i), is selected from the group consisting of: 1,6-Hexamethylenediamine; 1,7-Heptamethylenediamine; 1,8-Octamethylenediamine; 1,9-Nonamethylene diamine; 1,10-Decamethylenediamine; 1,11-Undecamethylenediamine; 1,12-Dodecamethylenediamine; 2,2,4-trimethylhexan-1,6-diamine; 2,4,4-trimethylhexan-1,6-diamine; 2-methylpentanediamine; isophoronediamine (3,5,5-trimethyl-3-aminomethyl-cyclohexylamine); 4,4'-diaminodicyclohexylmethane; 2,4'-diaminodicyclohexylmethane; 2,2'-diaminodicyclohexylmethane alone or in mixtures of isomers; 3,3'-dimethyl-4,4'-diaminodicyclohexylmethane; N-cyclohexyl-1,3-propanediamine; 1,2-diaminocyclohexane; TCD-diamine (3(4),8(9) bis(aminomethyl)-tricyclo [5.2.1.0$^{2,6}$]decane); xylylenediamines; aromatic amines; o-, m- or p-phenylenediamines; trimethylphenylenediamines; 4,4'-diaminodiphenylmethane; and mixtures thereof.

10. The process of claim 2, wherein the aliphatic and/or aromatic amine with at least two amino groups (a2.i), is selected from the group consisting of: aliphatic amines; 1,6-Hexamethylenediamine; 1,7-Heptamethylenediamine; 1,8-Octamethylenediamine; 1,9-Nonamethylenediamine; 2,2,4-trimethylhexan-1,6-diamine; 2,4,4-trimethylhexan-1,6-diamine; Decane-1,10-diamine; Dodecane 1,12-diamine; 2-methylpentanediamine; 1,3-Cyclohexanebis-(methylamine); and mixtures thereof.

11. The process of claim 1, wherein the solvent (a1.ii) for the polymer (a1.i) comprises a polar aprotic solvent.

12. The process of claim 1, wherein the solvent (a1.ii) for the polymer (a1.i) is selected from the group consisting of:

dimethylsulfoxide; dimethylformamide; dimethylacetamide; N-methylpyrrolidone; N-ethylpyrrolidone; sulpholane; tetrahydrofuran; and mixtures thereof.

13. The process of claim 12, wherein the non-solvent (a2.ii) comprises a protic solvent.

14. The process of claim 13, wherein the non-solvent (a2.ii) for the polymer (a1.i) is selected from the group consisting of: water; C1-C6 alkanols; C2-C6 alkanediols; C3-C12 alkanetriols; C4-C20 polyols; and hydrophilic polymers or copolymers.

15. The process of claim 1, wherein thermal treatment of the hollow-fibre membrane in step d) is carried out at an annealing temperature of 180 to 230° C.

16. The process of claim 1, wherein,
in step (a1) the phase (a1) composition consists of:
(a1.i) a polymer selected from the group consisting of: polyimides, copolyimides; block-copolyimides; polyetherimides; polyamidoimides; and
mixtures and blends thereof; and
(a1.ii) a solvent or a solvent mixture for said polymer (a1.i);
in step (a2) the phase (a2) composition consists of:
(a2.i) an amine based crosslinker, with at least two amino groups;
(a2.ii) a non-solvent or a non-solvent mixture for the polymer (a1.i).

17. The process of claim 1, wherein, in step d), annealing takes place for 15-300 minutes and, after heating ends, the hollow fibre membrane is actively cooled.

18. The process of claim 17, wherein annealing takes place in a surrounding atmosphere with less than 0.01% oxygen by volume.

* * * * *